(12) United States Patent
Tsujimoto et al.

(10) Patent No.: US 7,820,000 B2
(45) Date of Patent: Oct. 26, 2010

(54) TIRE PRODUCING METHOD AND TIRE MOLDING MACHINE

(75) Inventors: Tetsuo Tsujimoto, Tokyo (JP); Yukio Saegusa, Tokyo (JP); Tomohiro Irie, Tokyo (JP); Noriaki Kurabayashi, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 1119 days.

(21) Appl. No.: 10/497,069

(22) PCT Filed: Nov. 6, 2002

(86) PCT No.: PCT/JP02/11584

§ 371 (c)(1),
(2), (4) Date: Mar. 4, 2005

(87) PCT Pub. No.: WO03/045675

PCT Pub. Date: Jun. 5, 2003

(65) Prior Publication Data

US 2005/0142238 A1    Jun. 30, 2005

(30) Foreign Application Priority Data

Nov. 28, 2001    (JP) .............................. 2001-361864

(51) Int. Cl.
*B29D 30/32* (2006.01)
(52) U.S. Cl. ................ 156/131; 156/135; 156/398; 156/403; 156/406.2
(58) Field of Classification Search .................. 156/111, 156/131, 132, 135, 398, 403, 406.2, 64
See application file for complete search history.

(56) References Cited

U.S. PATENT DOCUMENTS 2,790,481 A  *  4/1957  Niclas et. al. ................ 156/131

(Continued)

FOREIGN PATENT DOCUMENTS

EP    0 813 952 A2    12/1997

(Continued)

OTHER PUBLICATIONS

Office Action for U.S. Appl. No. 10/566,363; mailed Feb. 25, 2010.

(Continued)

*Primary Examiner*—Geoffrey L Knable
(74) *Attorney, Agent, or Firm*—Oliff & Berridge, PLC

(57) ABSTRACT

In a tire molding process, a mutual positional deviation or angular deviation between the axis of a carcass member and the axis of a bead core takes place in a produced tire when the bead core is set on the outer periphery of cylindrical carcass member. By the use of an estimation formula for estimating the primary harmonic component in the waveform of a radial force, an inverse waveform with the primary harmonic component inversed is found with respect to the measurement waveform of the produced tire or with respect to the treatment waveform with a numerical value treatment applied thereto. Thereafter, in producing a tire of the same size by the mold used for producing the preceding tire, the mutual positional deviation or angular deviation between the axis of the carcass member and the axis of the bead core found by a backward calculation from the estimation formula is changed to set the bead core on the carcass member.

12 Claims, 18 Drawing Sheets

U.S. PATENT DOCUMENTS

| | | | |
|---|---|---|---|
| 3,510,375 A | 5/1970 | Batten | |
| 4,343,671 A * | 8/1982 | Enders | 156/401 |
| 4,596,617 A | 6/1986 | Ishii | |
| 4,634,489 A * | 1/1987 | Dupommier | 156/403 |
| 4,726,861 A * | 2/1988 | Vorih et al. | 156/131 |
| 5,273,600 A | 12/1993 | Yamamori et al. | |
| 5,322,587 A | 6/1994 | Kondo et al. | |
| 5,882,452 A * | 3/1999 | Sakamoto et al. | 156/64 |
| 6,004,414 A * | 12/1999 | Tabuchi et al. | 156/132 |
| 6,511,565 B2 * | 1/2003 | Omokawa | 156/130.7 |
| 6,514,441 B1 * | 2/2003 | Tanaka et al. | 264/40.1 |
| 2003/0010105 A1 * | 1/2003 | Kunsch et al. | 73/146 |
| 2003/0056874 A1 | 3/2003 | Durand et al. | |
| 2005/0142238 A1 | 6/2005 | Tsujimoto et al. | |
| 2007/0137764 A1 * | 6/2007 | Sawada et al. | 156/131 |

FOREIGN PATENT DOCUMENTS

| | | | |
|---|---|---|---|
| EP | 1 295 708 A2 | 3/2003 | |
| JP | 04-14439 A * | 1/1992 | |
| JP | 04-144439 A * | 1/1992 | |
| JP | A 4-193528 | 7/1992 | |
| JP | A 6-182903 | 7/1994 | |
| JP | A-06-320640 | 11/1994 | |
| JP | A 10-86240 | 4/1998 | |
| JP | A 10-291260 | 11/1998 | |
| JP | A 2000-117853 | 4/2000 | |
| JP | A-2001-30257 | 2/2001 | |
| JP | A 2002-52620 | 2/2002 | |

OTHER PUBLICATIONS

Aug. 5, 2010 Office Action issued in U.S. Appl. No. 10/566,363.

* cited by examiner

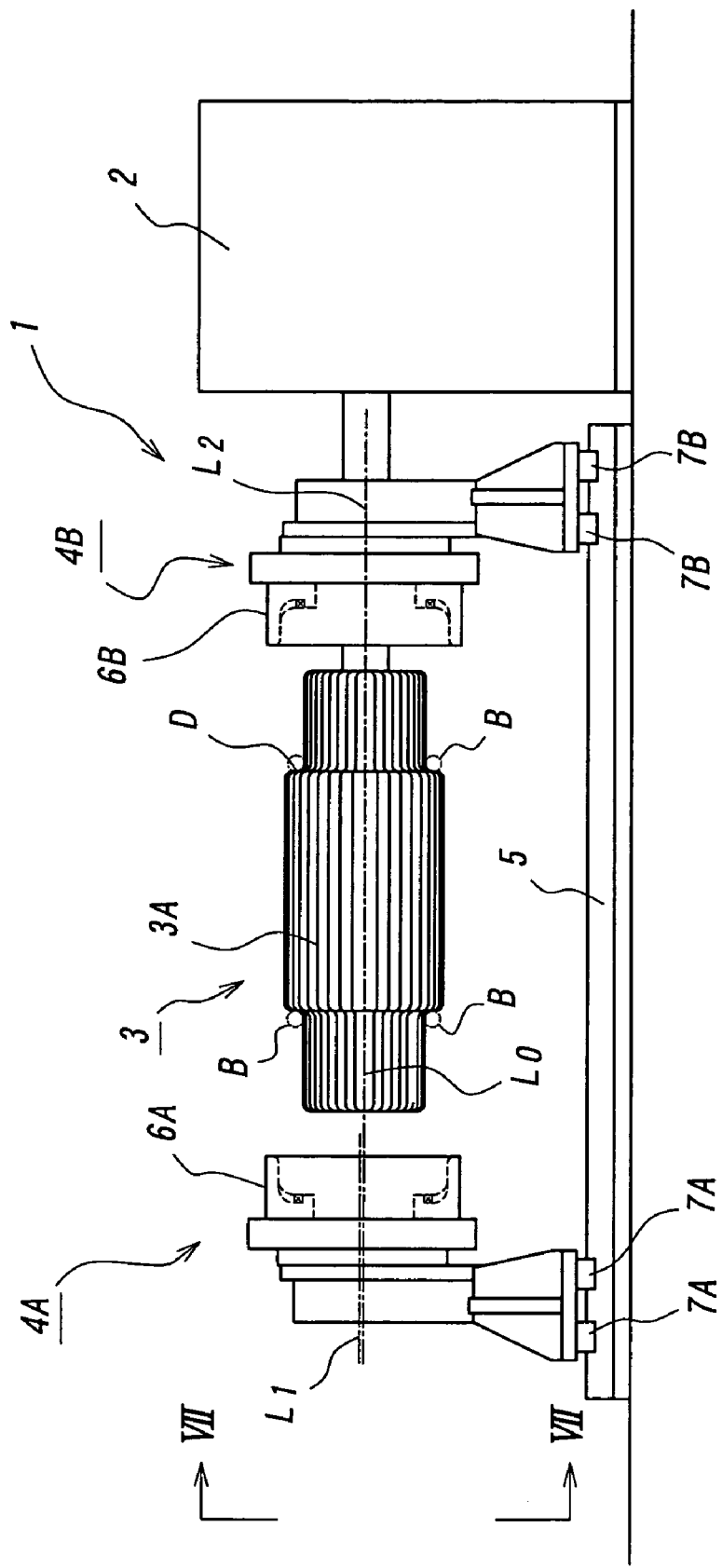

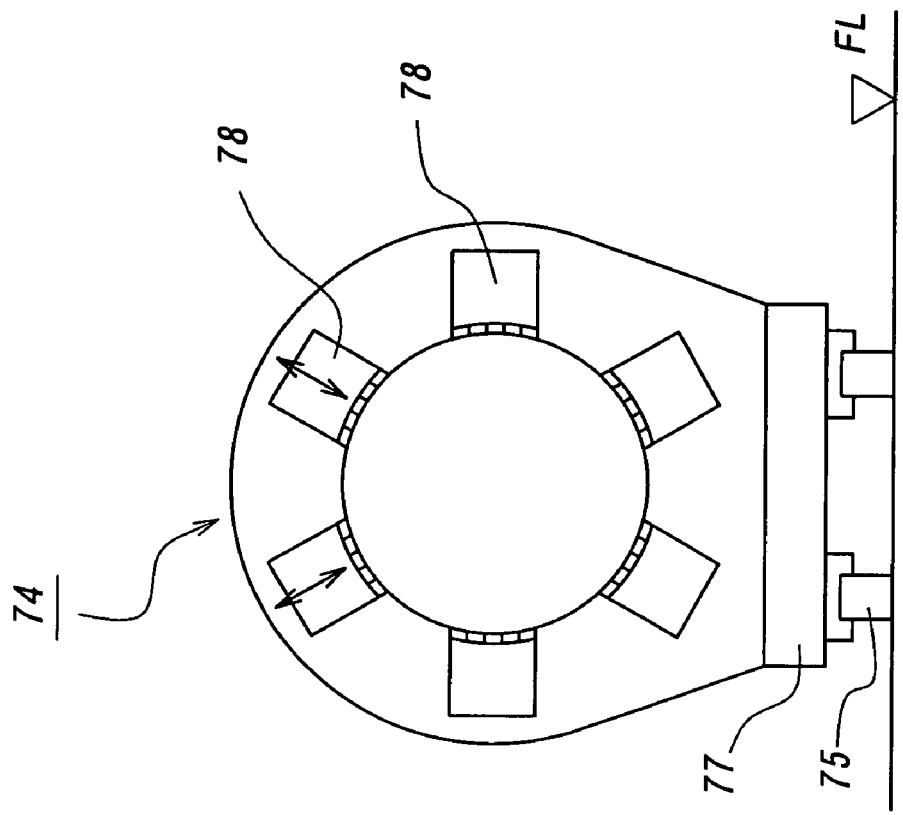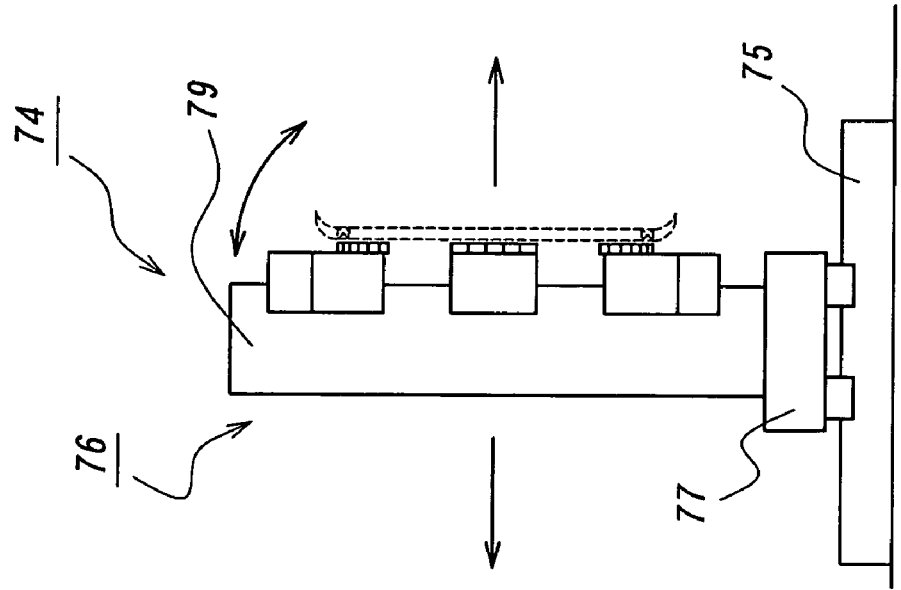

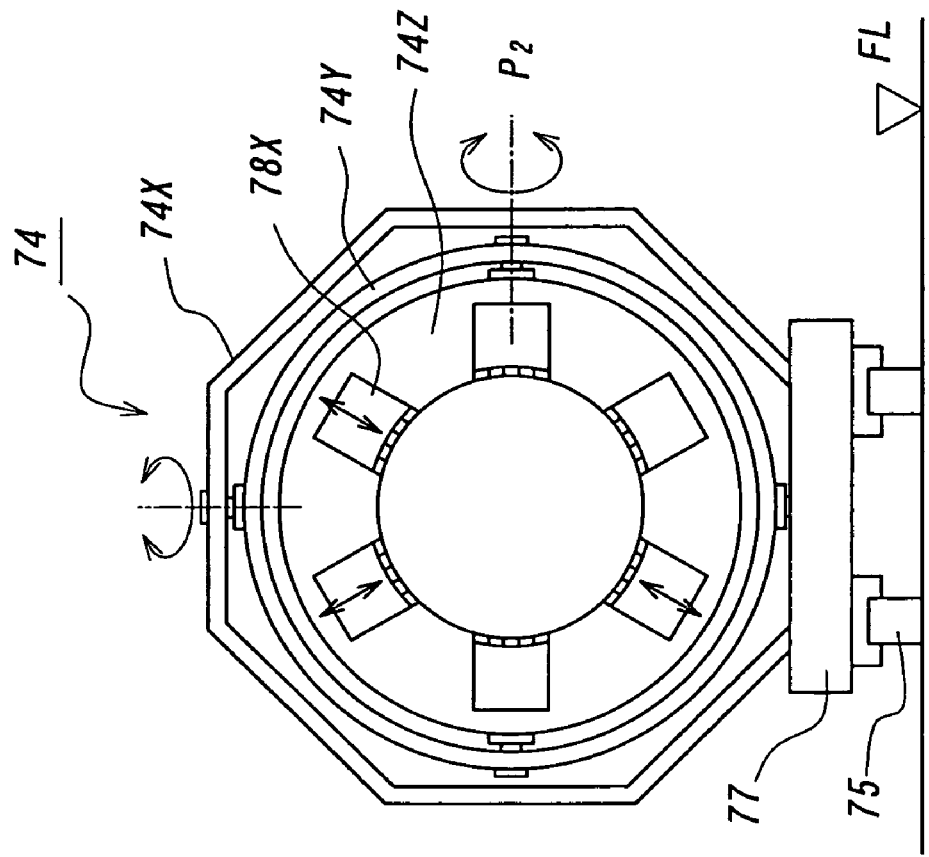
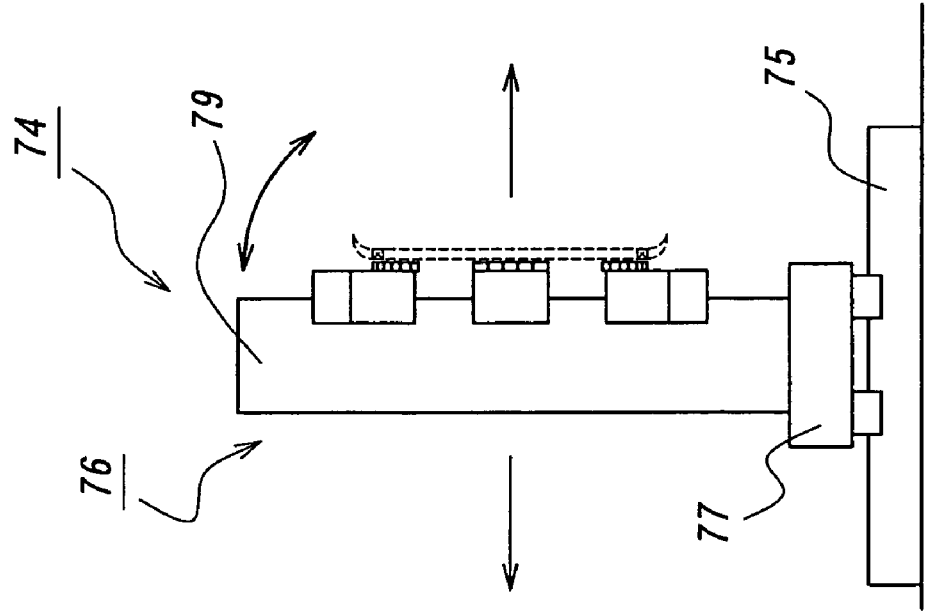

TIRE PRODUCING METHOD AND TIRE MOLDING MACHINE

FIELD OF THE INVENTION

The present invention relates to a tire producing method and a tire molding machine which improves the level of tire uniformity, more particularly variation (hereinafter referred to as "RFV") of force in the radial direction (hereinafter referred to as "RF").

BACKGROUND ART

The tire uniformity is one of the most important quality items, and improvement of this level is a significant development challenge. In the uniformity, there have been a wide variety of activities to investigate and address each of factors which worsen RFV in its causal relationship and the results have been maintained and controlled in order to improve this level, which has achieved improvement to some extent.

However, there are countless factors to worsen RFV and it is extremely difficult to take a measure against each of them and to maintain and control it, and it is getting hard to take a measure against individual factor and to further improve RFV using a method to maintain and control it. In the meantime, regardless of the factor, such a method is being examined for tires of a required size that information based on the waveform of RF measured online is fed back to a manufacturing process and a predetermined RFV variation factor is controlled online so as to improve RFV, but since there is no effective method for controlling RFV variation factor, it has hot been realized yet.

The present invention has been made in view of the above problem and it relates to a tire producing method in which information based on the waveform of RF measured online is fed back to a manufacturing process so as to control a predetermined RFV variation factor online, and its object is to provide an effective method to control the RFV variation factor and a tire molding machine which enables it so as to improve the level of RFV.

DISCLOSURE OF THE INVENTION

The present invention has been made in order to achieve the above object, and its constitution and action will be shown below.

(1) A tire producing method of the present invention is to produce a tire provided with a bead core and a carcass extending toroidally between each of the bead cores with a side portion folded back outward in the radial direction around the bead core, characterized in that:

an estimation formula is prepared in advance for estimating a primary harmonic component in the waveform of a radial force caused in a produced tire by a mutual positional deviation or an angular deviation between the axis of a carcass member and the axis of the bead core when the bead core is set on the outer periphery of the cylindrical carcass member or a primary harmonic component in the waveform of radial runout in a green tire caused by this deviation;

a single cycle of the radial force of the produced tire or radial runout of the green tire is measured and an inversed waveform with the primary harmonic component inversed is obtained for the measured waveform itself or treatment waveform in which predetermined numerical value treatment is applied to the measurement waveform of the radial force of the produced tire;

the mutual positional deviation or the angular deviation between the axis of the carcass member and the axis of the bead core causing this inversed waveform is obtained thereafter by backward calculation of the estimation formula when a tire of the same size is to be molded with a molding machine which molded this tire; and the bead core is set on the carcass member by changing the position or angle of the axis of at least one of the bead cores in the obtained deviation direction by an obtained deviation size.

Here, the primary component obtained by applying Fourier analysis to the waveform is called in this specification as the primary harmonic component of the waveform. Also, the mutual positional deviation between the axis of the carcass member and the axis of the bead core means parallel eccentricity of each of these axes, and the mutual angular deviation between these axes means relative inclination of these axes. And both of the positional and angular deviations are vector amounts with the respective direction and size of deviation.

In order to obtain effective improvement results by feeding back information based on the measurement waveform of RF measured online to the manufacturing process and controlling predetermined RFV variation factor online, it is necessary that correction operation to change the RFV variation factor can be uniquely related to change of the measurement waveform of RF which appears as a result of this correction operation and that a gain, that is, the size of change of the measurement waveform of RF to a unit operation amount of the RFV variation factor should be large enough.

When the RFV variation factor which can be an object to be controlled is examined closely from this point of view, it was found out that the primary harmonic component of the waveform obtained by measuring the length of each of the carcass cords extending between both the bead cores (hereinafter referred to as "cord path length") has an obvious correlation with the primary harmonic component of the measurement waveform of the RF of this tire. That is, it was found out that the phases of these primary harmonic components match each other and that their amplitudes are in a promotional relationship. And it was also found out that the amplitude and phase of the primary harmonic component of this cord path waveform are uniquely related to the size and direction of the positional deviation or angular deviation of the axis of the bead core to the axis of the carcass member, respectively, set in the cylindrical state in the molding process.

Moreover, it was also found out after harmonic analysis of RF of a tire to be produced that its primary harmonic component overwhelmingly affects RFV.

The present invention was made with a view to reduction of RFV through correction operation to change the position or angle of the axis of the bead core in molding a tire after it was found out based on the above examination result that when the bead core is to be set on the outer periphery of the cylindrical carcass member, an estimation formula for estimating the primary harmonic component of the waveform of RF taking place in a produced tire can be obtained through the mutual positional or angular deviation between the axis of the carcass member and the axis of the bead core.

This view will be explained based on graphs of each of the waveforms illustrated in FIGS. 1 and 2 with the circumferential position on the horizontal axis. As for the origin of the horizontal axis, this is standardized to be joined at a predetermined position on a molding drum when the carcass member is set, for example, so that they can be related to each other by making this joint position to be an origin common to all the waveforms. A waveform X1 shown in FIG. 1(a) is a measurement waveform of RF of a tire, and RFV of this tire is Vx1. A primary harmonic component Y1 of FIG. 1(b) can be obtained by Fourier analysis of the measurement waveform of FIG. 1(a), and this primary harmonic component Y1 can be specified by an amplitude Vy1 and a phase φy1. Then, an inversed waveform Z1 is obtained by inversing this waveform. This is the one shown in FIG. 2(a), and its amplitude and phase are Vy1 and (φy1−180°).

The size and direction of the positional deviation or angular deviation of the axis of the bead core generating this inversed waveform can be, as mentioned above, obtained by backward calculation from the estimation formula set in advance. And when a tire of the same size as the tire measured in FIG. 1(a) is to be molded by the same molding machine, the axis of the bead core is changed in the direction and by the size obtained by backward calculation from the estimation formula for molding, an RF measurement waveform X2 shown in FIG. 2(b) can be generated to which the waveform shown in FIG. 1(a) and the waveform shown in FIG. 2(a) are added. In the case of this example, without this operation, RFV of the tire whose RFV is expected to be Vx1 can be reduced to Vx2 by this method.

This precondition is based on the assumption that the tire molded by the same molding machine indicates the same RF waveform, but actually, in most cases, the other manufacturing conditions are different between the tire for which RF was measured and the tire to be given correction operation, even if they are produced by the same molding machine. In this case, if a relation between the RF measurement waveform XX of the tire for which RF was actually measured and the estimated RF waveform YY of the tire to be given correction operation assuming that the correction operation is not applied can be grasped, a numerical value treatment formula for deriving the waveform YY from the waveform XX is prepared in advance, the treatment waveform YY is calculated by applying this predetermined numerical value treatment to the waveform XX, and the above mentioned correction operation is applied to this treatment waveform YY so that the correction operation with higher correction effect can be achieved as compared with the case where the numerical value treatment is not executed.

In the above explanation, it was shown that RFV can be improved by controlling the position or attitude of the bead in the molding machine based on the RF waveform of a produced tire, but instead of the RF waveform of the produced tire, the waveform of radial runout of a green tire is measured and the position or attitude of the bead in the molding machine can be also controlled based on this waveform (hereinafter referred to as "RR waveform of GT"). The RR waveform of GT refers to the waveform of a radial change at a center position in the width direction of the outer circumference of a tread portion of the green tire measured by a distance sensor or the like when the green tire is mounted on a rim and internal pressure is filled in the green tire and then, the rim is rotated. And this RR waveform of GT has a high correlation with the molding factor waveform of RF which will be mentioned later, and since it is also found out that the molding factor waveform of RF has a high correlation with the position or attitude of the bead in the molding machine, the amplitude of the molding factor waveform of RF can be reduced and hence, RFV of the produced tire can be reduced by controlling the position or attitude of the bead on the molding machine based on the above mentioned argument so that the inversed waveform of the primary harmonic component of the RR waveform of the measured GT is generated.

A method for controlling the position or attitude of the bead in the molding machine using RR waveform of GT is to measure them prior to a vulcanization process for vulcanizing a tire, and since they are measured immediately after molding of a tire and they can be fed back to control of the position and attitude of the bead soon, a tire with excellent RFV level can be produced without uselessly vulcanizing tires.

In the tire producing method of the present invention, radial force of a produced tire or radial run-out of a green tire is measured for 1 cycle, an inversed waveform with its primary harmonic component inversed is obtained for the measured waveform itself or a treatment waveform in which predetermined numerical value treatment is applied to the measurement waveform of the radial force of the produced tire, and when a tire of the same size is to be molded by a molding machine which molded this tire after that, a mutual positional deviation or angular deviation between the axis of a carcass member and the axis of a bead core generating this inversed waveform is obtained by backward calculation of the estimation formula, the position or angle of the axis of at least one of the bead cores is changed in the obtained deviation direction and by the obtained deviation size so as to set the bead core on the carcass member so that, as explained above, the RFV level can be drastically improved and with that, fluctuation between RFV tires can be reduced.

(2) According to the tire producing method of the present invention, the numerical value treatment in the invention described in (1) is treatment to subtract a variation waveform after molding estimated and prepared in advance, indicating variation of the radial force caused by a process after completion of the molding from the measurement waveform of the radial force.

For the tire molded by the molding machine, its uniformity is measured after vulcanized by a vulcanizing machine. The vulcanization process has RF variation factors fluctuating according to the vulcanization machine, such as roundness of a mold, for example, and even if in a tire molded with totally the same material under the same conditions, RF measurement waveform is varied according to the vulcanizing machine for vulcanization.

This means that, if RF variation factor in the vulcanization process cannot be ignored, a favorable result cannot be gained when a tire molded with correction operation vulcanized by a different vulcanizing machine according to the RF waveform of the tire vulcanized by a certain vulcanizing machine.

In order to address this problem, treatment is applied to the RF measurement waveform to subtract a variation waveform after molding indicating variation of RF caused by the process after molding has been completed, including the vulcanization process, and effective correction operation can be executed and RFV can be improved advantageously with the same method even for a tire molded by the same molding machine and vulcanized by a different vulcanizing machine only if it is molded by the same molding machine.

This tire producing method will be explained in detail below based on graphs of waveforms illustrated in FIGS. 3 and 4 with circumferential positions on the horizontal axis. The origin of the horizontal axis is set in the same way as in FIGS. 1 and 2. Also, in the following explanation, for simplicity of the explanation, the waveform indicating variation of RF caused by the process after completion of molding is called as "vulcanization factor waveform," while the waveform indicating the variation of RF caused by the process prior to completion of molding as "molding factor waveform."

A waveform M1 shown in FIG. 3(a) shows a primary harmonic component of the molding factor waveform of a tire molded by a certain molding machine. A waveform A1 shown in FIG. 3(b) shows a primary harmonic component of the vulcanization factor waveform when this tire is vulcanized by a vulcanizing machine A, and a waveform B1 shown in FIG. 3(c) shows a primary harmonic component of the vulcanization factor waveform when this tire is vulcanized by a vulcanizing machine B, respectively. For simplicity, assume that all the amplitudes of the waveforms M1, A1 and B1 are all Va and the phases are 0°, 90° and −90°, respectively.

And an actual measurement waveform X3 of RF of the tire measured after vulcanization of a molded tire by the vulcanizing machine A is shown in FIG. 4(a). This primary harmonic component Y3 is a composite of the waveform M1 and the waveform A1, and its amplitude and phase are $2^{1/2}$Va and 45°, respectively.

If the tire molded after the above correction operation for changing the axis of the bead core based on a waveform Z3 shown in FIG. 4(b) in which the primary harmonic component Y3 of the actual RF measurement waveform X3 is not given numerical value treatment but it is merely inversed is vulcanized by the vulcanizing machine B, an expected RF measurement waveform of this tire is a waveform X4 shown in FIG. 5(a). That is, the primary harmonic component Y4 of X4 is the one with Z3 overlapping the composite of M1 and B1. And the amplitude and phase of Y4 becomes 2Va, 90°, respectively, and by carrying out this correction operation, RFV becomes larger than the RF measurement waveform expected when correction operation is not executed by $2^{1/2}$ times.

In the meantime, if the numerical value treatment for eliminating the vulcanization factor waveform is executed, that is, the treatment to subtract the vulcanization factor waveform A1 in the case of vulcanization with the vulcanizing machine A from the primary harmonic component Y3 of the actual measurement waveform X3 of RF shown in FIG. 4(a) is executed to create a treatment waveform, this treatment waveform becomes, as obvious from the above explanation, M1, and if a tire is molded after correction operation to generate an inversed waveform of this M1, the molding factor waveform is expected to become zero in balance, and if the vulcanization factor waveform B1 when this tire is vulcanized by the vulcanizing machine B is synthesized to this, the synthesized waveform Y5 becomes the same as the waveform B1. Therefore, it can be expected that the measurement waveform of RF of the tire molded after correction operation based on the treatment waveform to which the numerical value treatment for eliminating the vulcanization factor waveform is applied is, as shown in FIG. 5(b), an RF measurement waveform X5 having the waveform Y5 as the primary harmonic component. The amplitude and phase of this Y5 are Va and −90°, respectively, and RFV can be reduced from $2^{1/2}$ Va to Va.

(3) According to the tire producing method of the present invention, in the invention described in either (1) or (2), in a molding method in which only the diameter of a center portion in the axial direction of the cylindrical carcass member is enlarged, and a bead core is pressed onto a stepped surface generated between it and the remaining carcass member perpendicular to the axial direction from outside the axial direction, and the bead core is set on the carcass member,
the position of the axis of at least one of the bead cores is changed, and the bead core is set on the carcass member.

According to this tire producing method, if the position of the axis of one of the bead cores is deviated in parallel to the axis of the carcass member, for example, the cord path length located in the deviated direction becomes shorter, while the cord path on the opposite side becomes longer, and variation along the circumferential direction of the cord path can be effectively controlled, and thus, RFV of the tire can be improved.

(4) According to the tire producing method of the present invention, in the invention described in either (1) or (2), in the molding method in which both bead cores are positioned at a predetermined standby position outward in the radial direction of the cylindrical carcass member, the diameter of at least a portion of the carcass member is enlarged on the inner circumferential surface of the bead core, and the bead core is set on the carcass member,
the angle of the axis of at least of one the bead cores is changed, and the bead core is set on the carcass member.

According to this tire producing method, since the axis of one of the bead cores is inclined and the angle is deviated toward the axis of the carcass member, the cord path in the direction moved by this inclination operation outside in the axial direction can be made longer, while the cord path in the direction deviated toward the center side in the axial direction can be made shorter so that variation along the circumferential direction of the cord path can be effectively controlled.

(5) A tire molding machine of the present invention is provided with a molding drum for setting a carcass member on the outer circumferential surface and for enlarging the diameter of only the center portion in the axial direction of the set carcass member, and
a bead setter having a holding part for holding one of a pair of bead cores for moving each of the holding parts in the axial direction and pressing the held bead core to a stepped surface generated on the side of the center portion of the carcass member whose diameter was enlarged from outside in the axial direction, characterized in that
a decentering control mechanism is provided for decentering the axis of the holding part of at least one of the bead setters to the axis of the molding drum in a required direction only by a required interval.

Since this tire molding machine is provided with a decentering control mechanism for decentering the axis of the holding part of at least one of the bead setters to the axis of the molding drum in parallel in a required direction by a required interval, the axis of the bead core held by the holding part can be similarly decentered to the axis of the carcass member set on the outer periphery of the molding drum, which can improve RFV.

Here, the holding part is not necessarily formed in the concentric manner with respect to the axis of the holding part, and the axis of a standard ring when a round standard ring of the same size as the bead core is held by the holding part is defined as the axis of the holding part. This also applies to the following explanation in this specification.

Also, this tire molding machine exerts favorable effects also in the point which will be explained below. In the tire quality, the tire balance is also important besides uniformity, but if a measure is taken for improving RFV, balance might be deteriorated, while a measure to improve balance is taken on the contrary, RFV might be worsened, and there is a situation where both can not be realized at the same time. If this tire molding machine is used for controlling the cord path length for this, it does not give a significant influence on the balance and both balance and RFV can be improved.

That is, first, after a measure to improve balance is taken, this tire molding machine is used to adjust the axis of the bead core, and RFV can be reduced without affecting the improved balance, and thus, this tire molding machine achieves improvement of both balance and RFV of a tire and exerts an advantageous effect.

(6) A tire molding machine of the present invention is provided with a bead-core transfer device having a holding part for holding one of a pair of bead cores and for moving each of the holding parts in the axial direction and disposing the held bead core separated in the axial direction by a predetermined interval, and a molding drum for setting a carcass member on the outer periphery, inserting the set carcass member inside the radial direction of both bead cores disposed as above, enlarging the diameter of at least a portion of the carcass member in the axial direction and for crimping the carcass member on the inner circumferential surface of the bead core, characterized in that an inclination control mechanism is provided for inclining the axis of the holding part of at least one of the bead setters toward the axis of the molding drum in a required direction by a required angle.

According to this tire molding machine, since the inclination control mechanism is provided for inclining the axis of the holding part of at least one of the bead setters toward the axis of the molding drum in a required direction by a required angle, the axis of the bead core held by the holding part can be similarly inclined toward the axis of the carcass member set on the outer periphery of the molding drum, and thus, RF can be improved.

Also, it is apparent from the above explanation that this tire molding machine exerts an advantageous effect in improving both tire balance and RFV level at the same time.

BRIEF DESCRIPTION OF THE DRAWINGS

FIG. 6 is a schematic front view showing a first embodiment of a tire molding machine according to the present invention.

FIG. 16 is a schematic view of a bead-core transfer device.

FIG. 20 is a schematic view of a bead-core transfer device.

BEST MODE FOR CARRYING OUT THE INVENTION

A first embodiment of a tire molding machine according to the present invention will be explained based on FIGS. 6 through 9. FIG. 6 is a schematic front view showing a tire molding machine 1 according to the present invention.

A tire molding machine 1 is provided with a molding machine body 2, a molding drum 3 supported by the molding machine body 2 in the cantilever manner and rotated for setting a tire member including a carcass member, each of bead setters 4A, 4B disposed on both sides in the axial direction of the molding drum 3 and moved in the axial direction, a rail 5 fixed facing the axial direction, and running guides 7A, 7B mounted to the bead setters 4A, 4B and running on the rail 5 while supporting them.

FIG. 6 shows the tire molding machine 1 in the state where, after the molding drum 3 sets the carcass member C, the diameter of a center portion 3A of the molding drum 3 is enlarged and a center portion of the carcass member is enlarged, and a stepped surface D is formed on both side surfaces of the center portion of the carcass member C.

Each of the bead setters 4A, 4B is provided with holding parts 6A, 6B for holding the bead cores B, respectively, and is capable of moving the holding parts 6A, 6B to the center in the axial direction and pressing the bead core B to the stepped surface D of the carcass member C from outside in the axial direction so as to set the bead core B on the carcass member C.

This tire molding machine 1 can move an axis L1 of the holding part 6A of the left bead setter 4A in both horizontal and vertical surfaces by a required amount, respectively, in parallel to an axis L1 of the molding machine, and by movement of the axis L1 in both of these horizontal and vertical surfaces, the amplitude and phase of the primary harmonic component of the "cord path waveform" can be controlled to required values. Details of this mechanism will be explained below. An axis L2 of the holding part 6B of the right bead setter 4B is fixed.

Figure 1A:
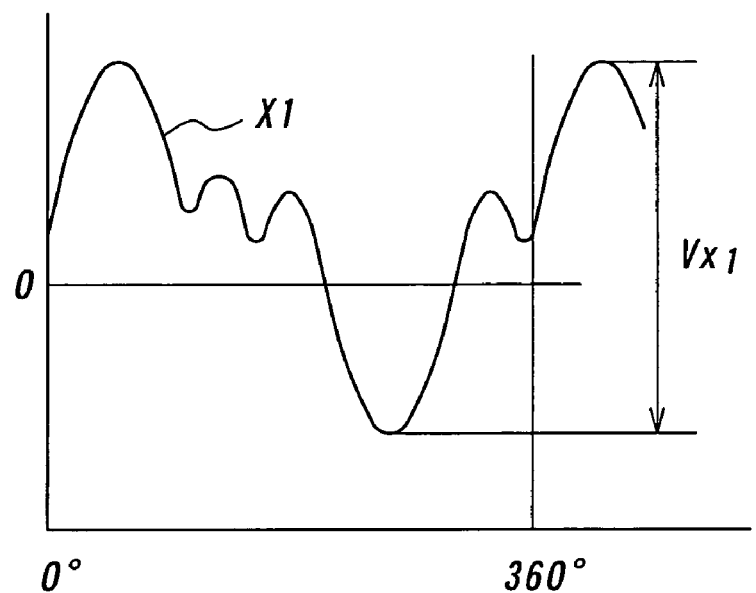
FIG. 1 is a waveform of RF explaining a tire producing method according to the present invention.
Figure 1B:
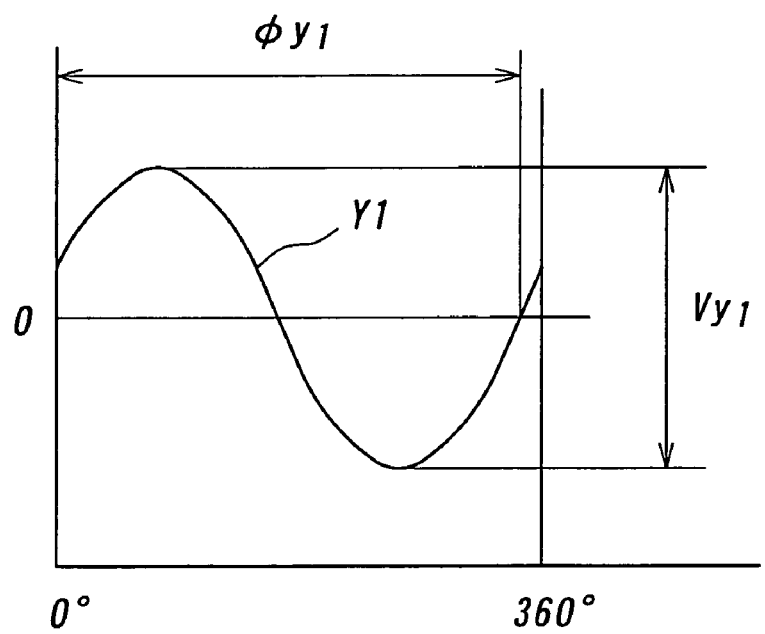
Figure 2A:
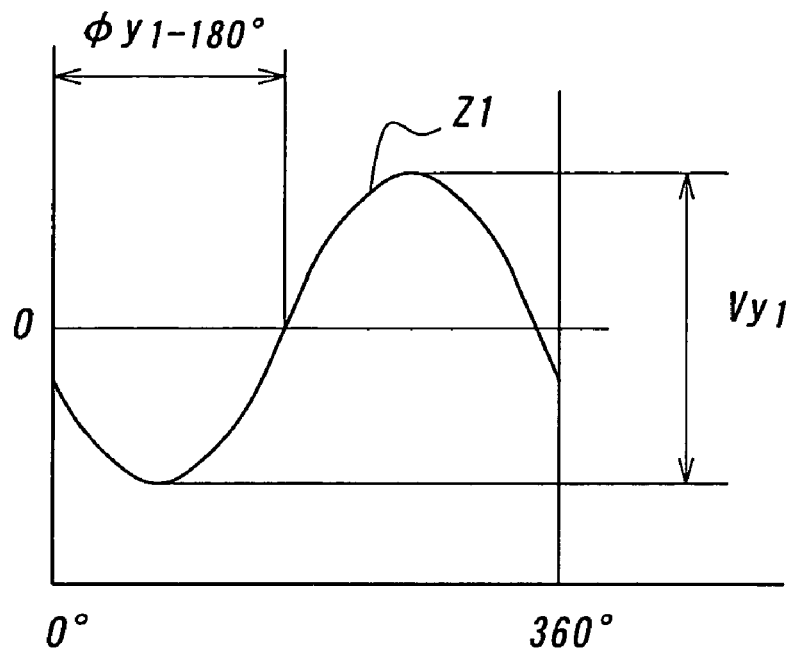
FIG. 2 is a waveform of RF explaining a tire producing method according to the present invention.
Figure 2B:
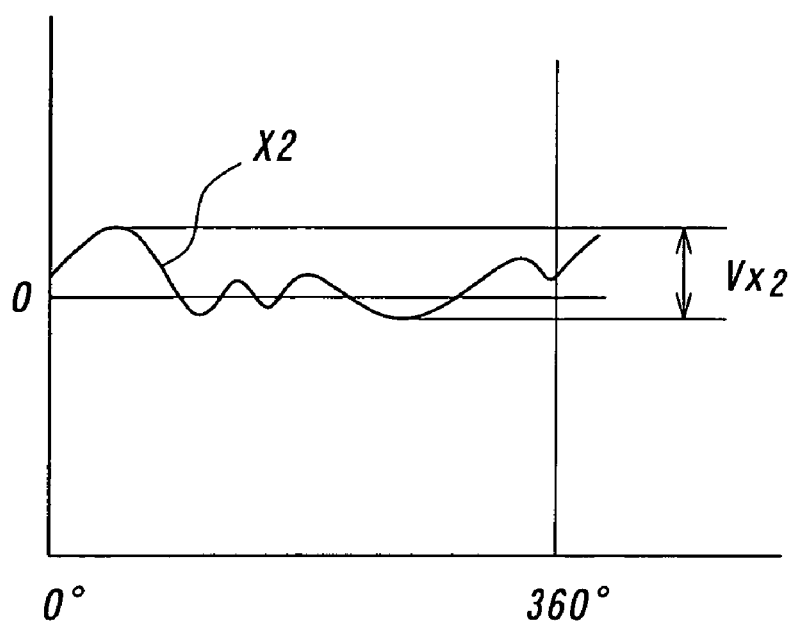
Figure 3A:
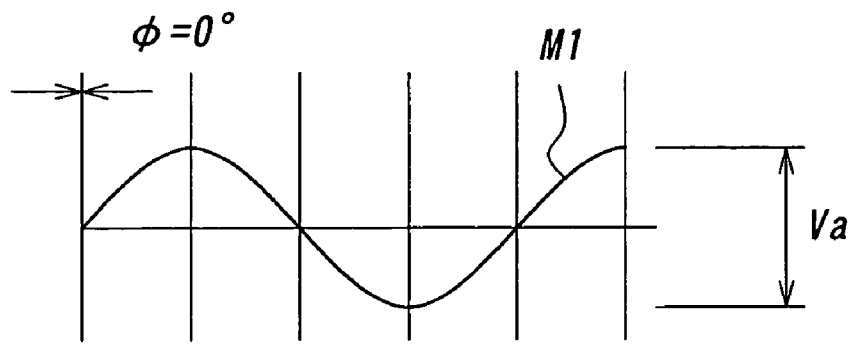
FIG. 3 is a waveform of RF explaining a tire producing method according to the present invention.
Figure 3B:
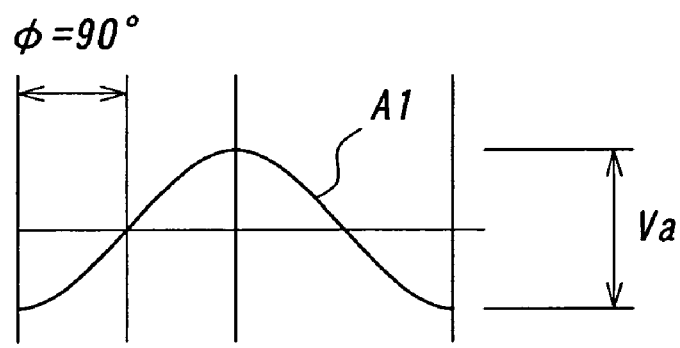
Figure 3C:
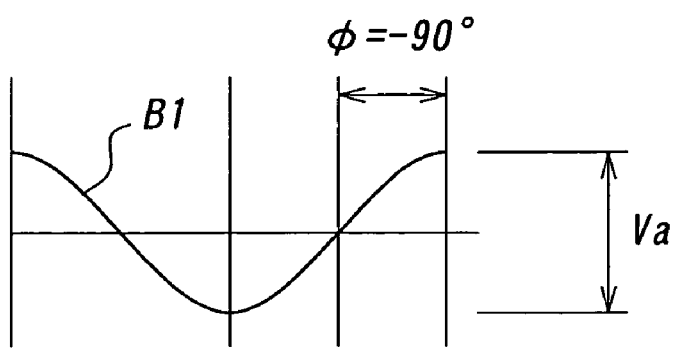
Figure 4A:
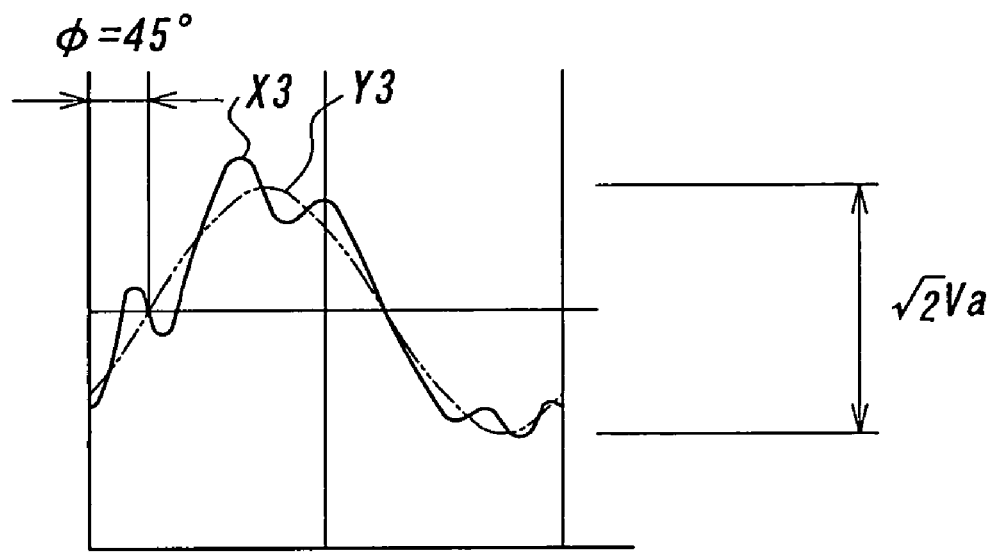
FIG. 4 is a waveform of RF explaining a tire producing method according to the present invention.
Figure 4B:
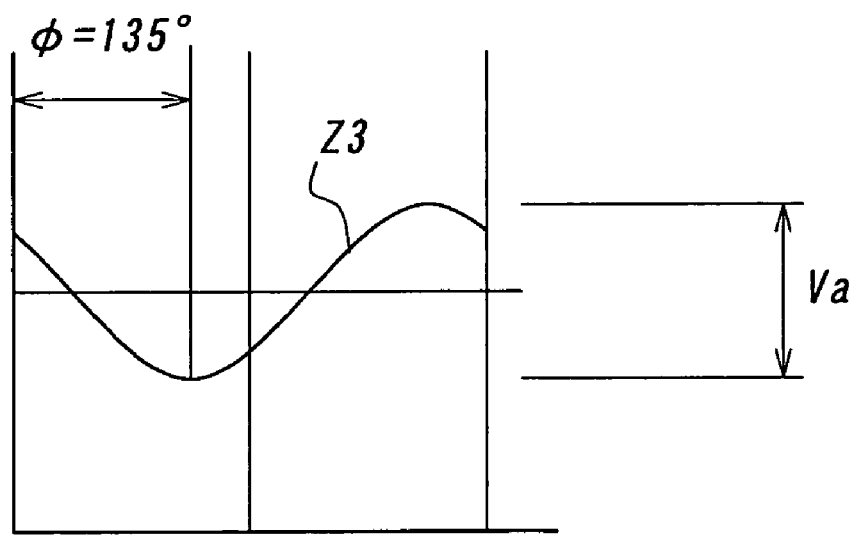
Figure 5A:
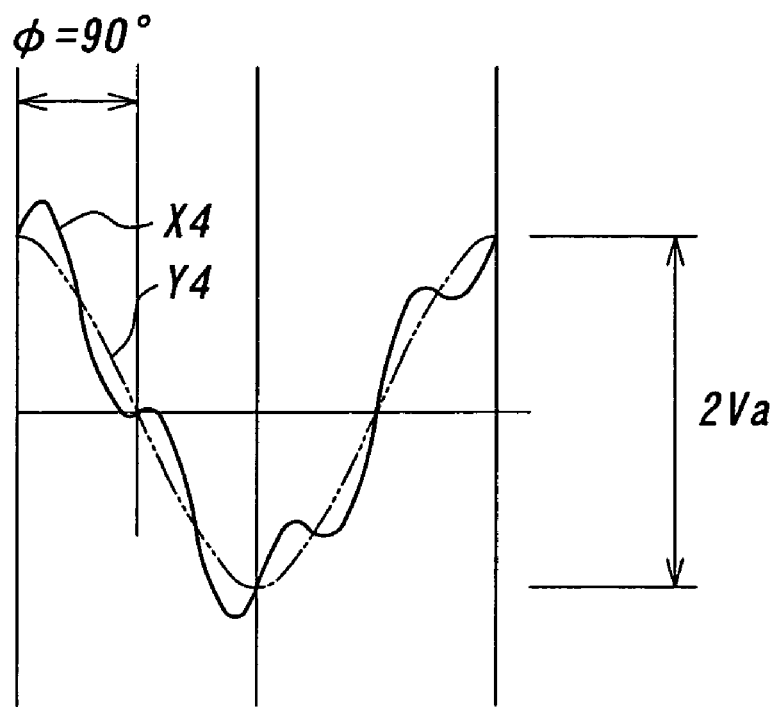
FIG. 5 is a waveform of RF explaining a tire producing method according to the present invention.
Figure 5B:
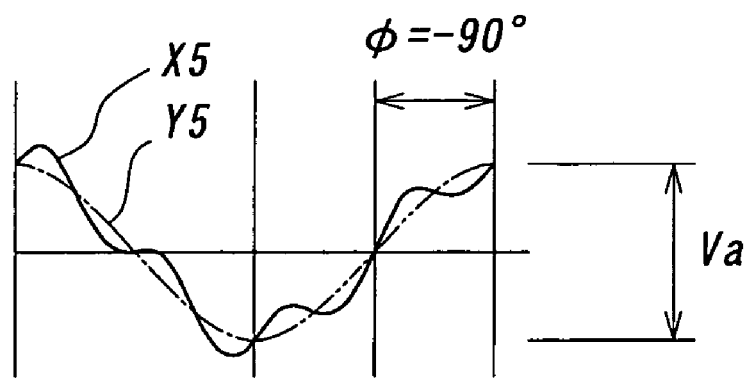
Figure 7:
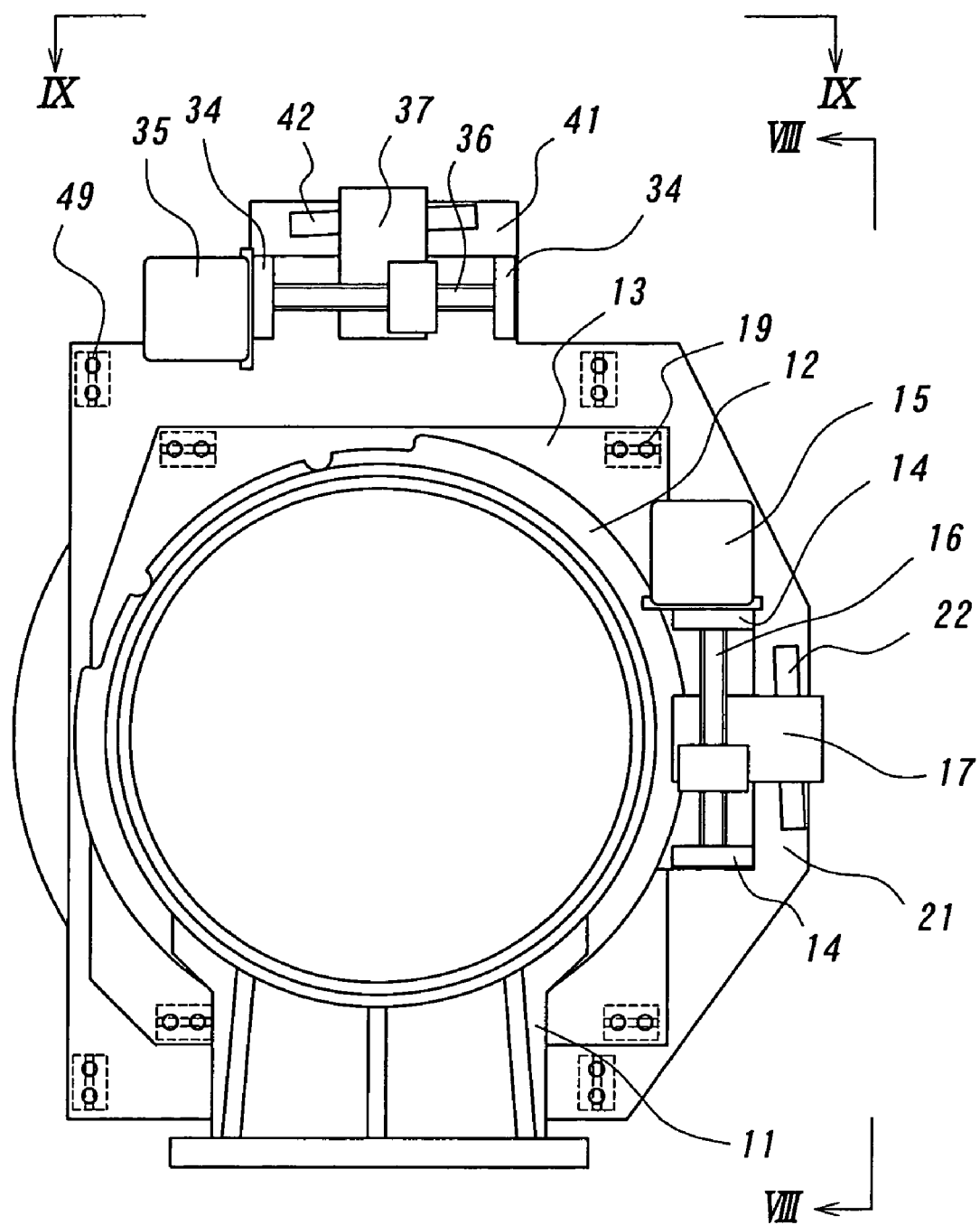
FIG. 7 is a front view showing a bead setter.
Figure 8:
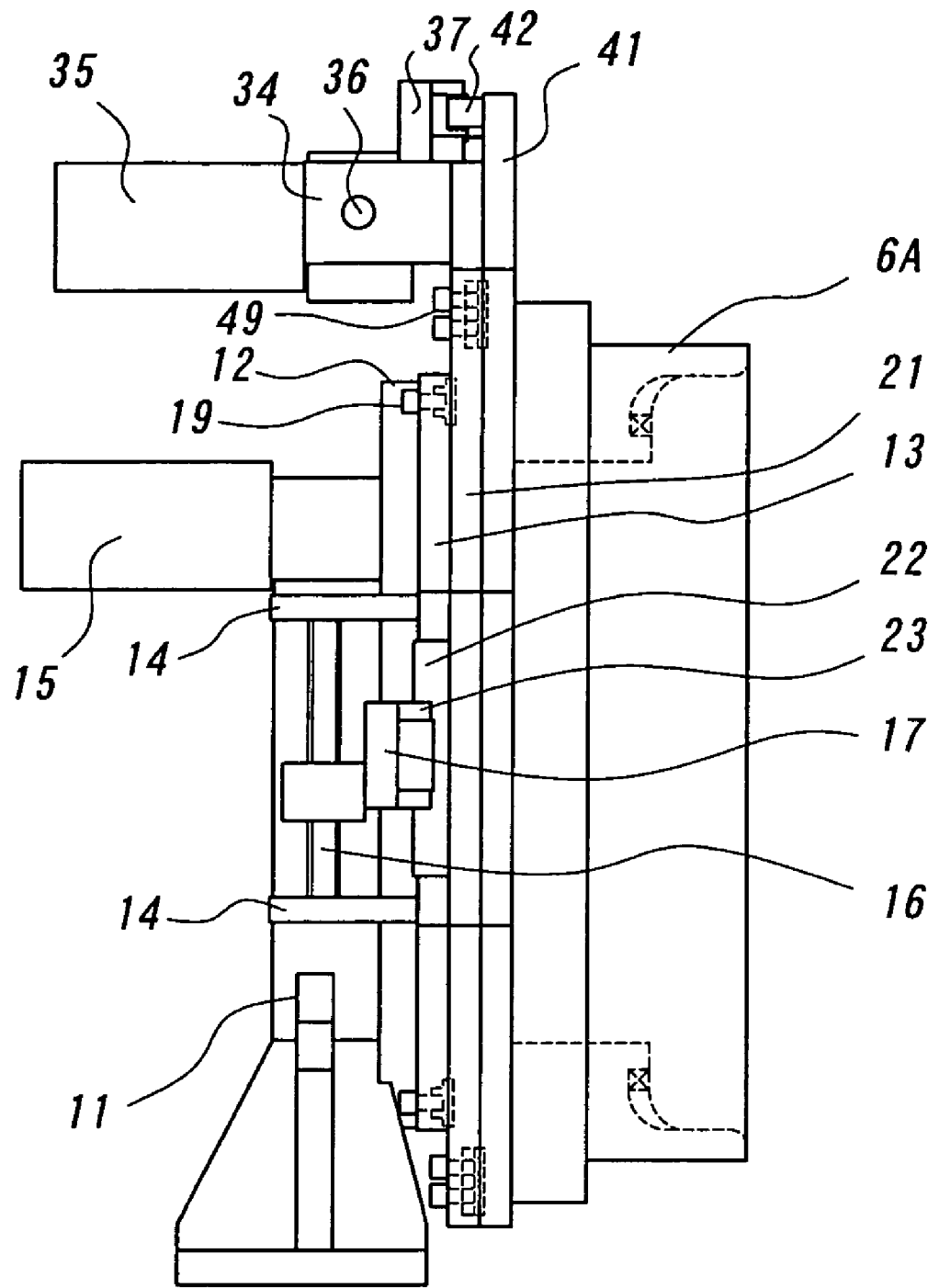
FIG. 8 is a side view showing a bead setter.
Figure 9:
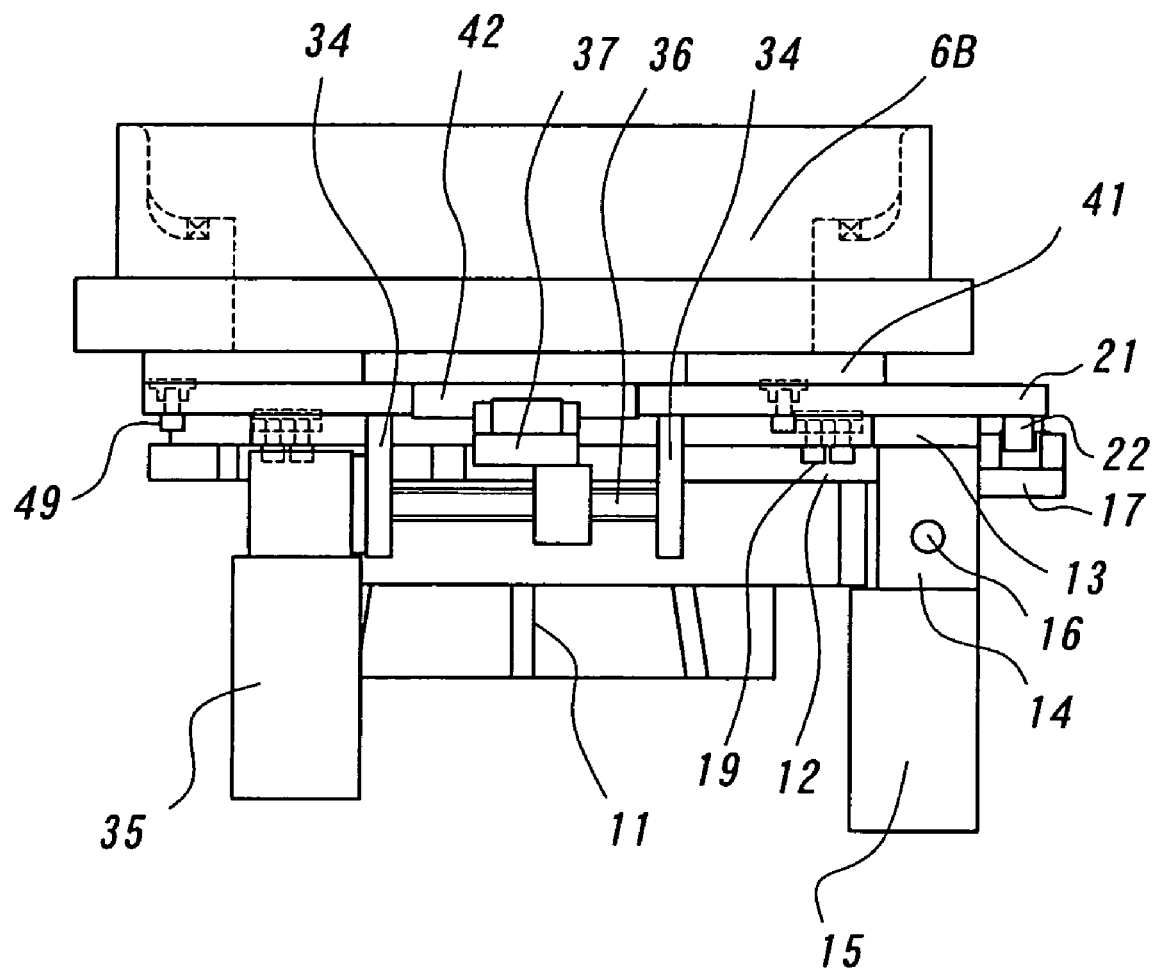
FIG. 9 is a side view showing a bead setter.

FIG. 7 is a front view of the left bead setter 4A in FIG. 6 seen from an arrow VII-VII, FIG. 8 is a side view of this bead setter 4A seen from an arrow VIII-VIII in FIG. 7, and FIG. 9 is a side view seen from an arrow IX-IX in FIG. 7. The bead setter 4A is provided with a base 11, a fixed plate 13 mounted to the base 11 through an intermediate ring 12, a servo motor 15 mounted to the fixed plate 13 through a bracket 14, a vertical screw shaft 16 supported by the bracket 14 and rotated by the servomotor 15, a moving block 17 screwed with the screw shaft 16 and reciprocatingly displaced in the vertical direction with rotation of the screw shaft 16, and a right-and-left movable plate 21 guided by a guide pin 19 provided on the fixed plate 13 and reciprocatingly displaced in the horizontal direction. Also, an inclination guide 22 extending with slightly inclination in the vertical direction is fixed and provided on the right-and-left movable plate 21, and an inclined guide engagement portion 23 moving in engagement with this inclination guide 22 is fixed and provided on the moving block 17.

Moreover, this right-and-left movable plate 21 is provided with a servo motor 35 mounted via a bracket 34, a horizontally extending screw shaft 36 supported by the bracket 34 and rotated by the servo motor 35, a moving block 37 screwed with the screw shaft 36 and reciprocatingly displaced in the horizontal direction with rotation of the screw shaft 36, a vertically movable plate 41 guided by a guide pin 39 provided on the right-and-left movable plate 21 and reciprocatingly displaced in the vertical direction and a holding part 6B fixed to the vertically movable plate 41, and moreover, an inclination guide 42 extending with slight inclination in the horizontal direction is provided and fixed to the vertically movable plate 41 and an inclination guide engagement portion 43 moving in engagement with this inclination guide 42 is fixed and provided on the moving block 37.

In the bead setter 4A, when the servo motor 15 is driven and the screw shaft 16 is rotated, the moving block 17 is moved in the vertical direction. The movement of the right-and-left movable plate 21 is restricted only to the horizontal direction, and the inclination guide 22 mounted to the right-and-left movable plate 21 is engaged with the inclination guide engagement portion 23 of the moving block 17, and by rotating the screw shaft 16, the right-and-left movable plate 21 can be moved horizontally.

When an inclination angle of the inclination guide 22 to the vertical direction is α, a horizontal moving distance of the right-and-left movable plate 21 is tan α times of the vertical moving distance of the moving block 17, and by controlling the rotation angle of the servo motor, the axis of the holding part 6A mounted to the right-and-left movable plate 21 through the vertically movable plate 41 can be decentered in the horizontal direction by a required amount in parallel to the axis of the molding drum 3. Also, if tan α is made smaller, the stop position accuracy of the right-and-left movable plate 21 is improved by that amount, and right and left positioning of the axis L1 of the holding part 6A can be made with accuracy.

Also, by driving the servo motor 35 mounted to the right-and-left movable plate 21 via the bracket 34, with the similar action, the vertically movable plate 41 can be displaced in the vertical direction to this right-and-left movable plate 21, and moreover, this can be stopped at a required position with high accuracy, and this axis L1 can be positioned vertically with high accuracy by moving the holding part 6A in the vertical direction.

And by the above action, by driving both the servo motor 15 and the servo motor 35, the axis of the holding part 6A can be moved both in the horizontal and the vertical directions and positioned with high accuracy.

In this tire molding machine 1, the axis L2 of the holding part 6B of the right bead setter 4B is fixed, while only the axis L1 of the holding part 6A of the left bead setter 4A is moved in both the horizontal and the vertical surfaces by a required amount in parallel to the axis L1 of the molding machine so as to control the "cord path waveform," but as its alternative, the "cord path waveform" may be controlled by moving the axis L1 of the holding part 6A of the left bead setter 4A in the horizontal surface only by a required amount in parallel to the axis L1 of the molding machine and by similarly moving the axis L2 of the holding part 6B of the right bead setter 4B in the vertical surface.

Also, in the above explanation, instead of the servo motors 15, 35, a normal motor may be used, and control is made so that this is rotated only by a predetermined amount so as to move the axis L1 of the holding part 6A.

Figure 10:
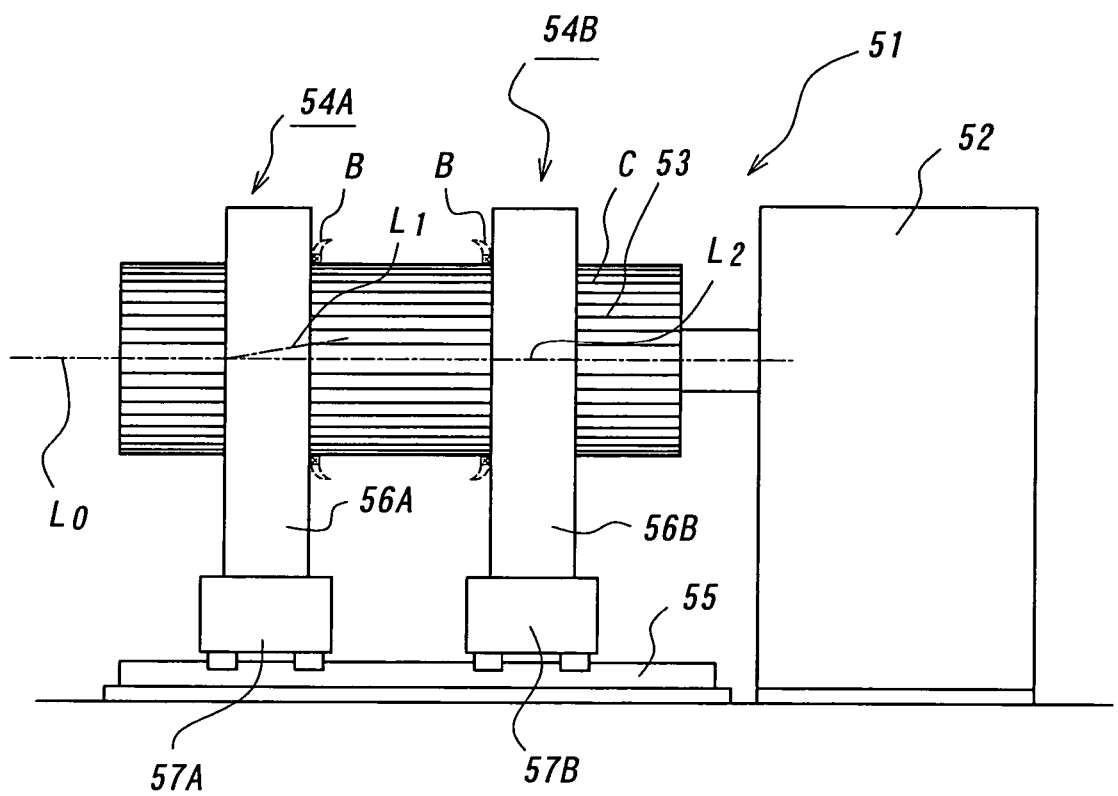
FIG. 10 is a schematic front view showing a second embodiment of a tire molding machine according to the present invention.

A second embodiment of the tire molding machine according to the present invention will be explained based on FIGS. 10 through 14. FIG. 10 is a schematic front view showing a tire molding machine 51. The tire molding machine 51 is provided with a molding machine body 52, a molding drum 53 supported by the molding machine body 52 in the cantilever manner and rotated for setting a tire member including a carcass member C, each of bead-core transfer devices 54A, 54B disposed on both sides in the axial direction of the molding drum 53 and moved in the axial direction, and a rail 55 supporting them and guiding them in the axial direction.

Each of the bead-core transfer devices 54A, 54B is provided with running base portions 57A, 57B supporting holding parts 56A, 56B holding the bead core B and running on the rail. FIG. 10 shows the tire molding machine 51 in the state where, after setting the carcass member C on the molding drum 53, the bead-core transfer devices 54A, 54B holding the bead core B are moved in the axial direction and arranged at a predetermined position in the axial direction on the outer periphery of the molding drum 53.

After this state, the bead core B can be set on the carcass cord C by enlarging the diameter of the molding drum 53 and by pressing the carcass member C on the inner circumferential face of the bead core B held by the holding parts 56A, 56B.

This tire molding machine 51 can incline the axis L1 of the holding part 56A of the left bead-core transfer device 54A in the vertical surface by a required amount, and also, the axis L2 of the holding part 56A of the right bead-core transfer device 54A can be inclined in the horizontal surface. This mechanism will be described in detail below, and by inclining each of the holding parts 56A, 56B in the vertical surface and the horizontal surface, respectively, by a required angle, the amplitude and phase of the primary harmonic component of the "cord path waveform" can be controlled to a required value.

Figure 11:
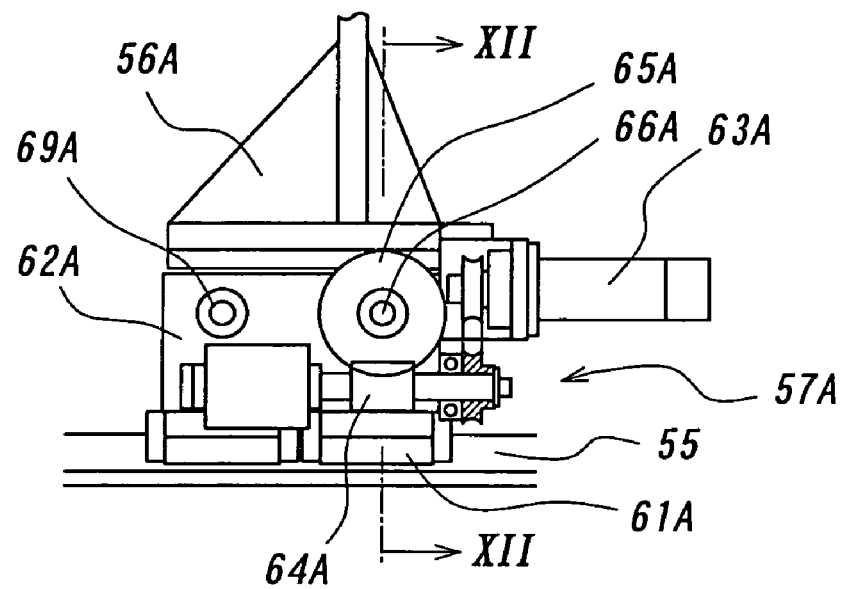
FIG. 11 is a side view of a bead-core transfer device.
Figure 12:
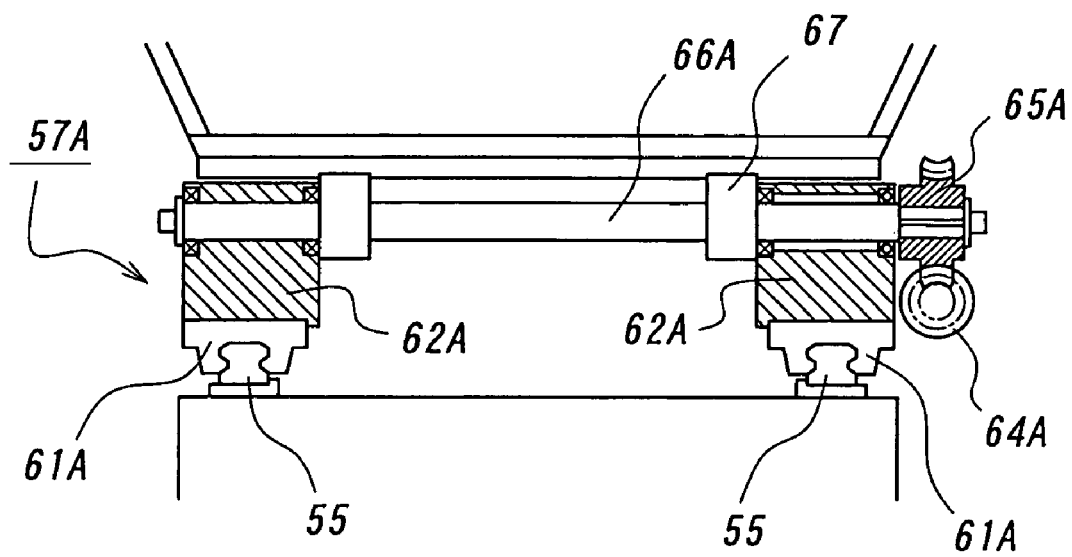
FIG. 12 is a cross sectional view of a bead-core transfer device.

FIG. 11 is a side view showing a running base portion 57A of the left bead-core transfer device 54A shown in FIG. 10 and FIG. 12 is a XII-XII cross sectional view of FIG. 11. The running base portion 57A of the bead-core transfer device 54A is provided with a runner 61A running on the rail 55 and a base block 62A fixed to the runner 61A. A rotation center shaft 69A extending horizontally is fixed and mounted to the base block 62A, and the holding part 56A is mounted around the rotation center shaft 69A capable of oscillation. That is, the holding part 56A can oscillate in the vertical surface around the rotation center axis 69A provided on the running base portion 57A.

Also, on the base block 62A, a servo motor 63A, a warm 64A connected to an output shaft of the servo motor 63A and a warm wheel 65A engaged with the warm 64A and directly connected to a driving shaft 66A for rotating it are provided. The driving shaft 66A extending in parallel to a rotation center shaft 69A is supported rotatably by the base block 62A and fixed and connected to the holding part 56A.

By rotating the servo motor 63A by a predetermined angle and rotating the driving shaft 66A through the warm 64A and the warm wheel 65A, the holding part 56A can be oscillated around the rotation center shaft 69A, and then, the axis line of the holding part 56A can be inclined in the vertical surface by a required angle.

Figure 13:
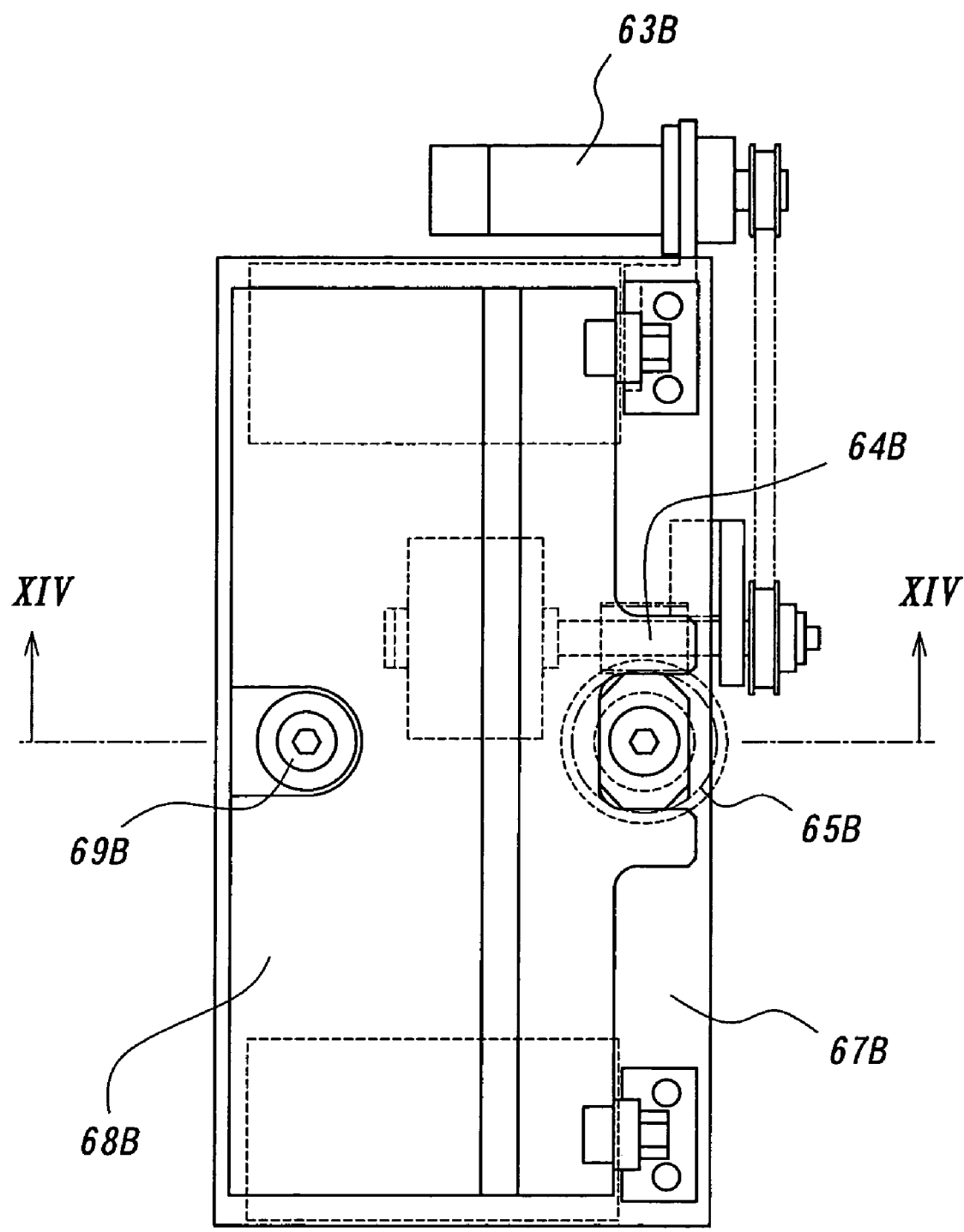
FIG. 13 is a plan view of a bead-core transfer device.
Figure 14:
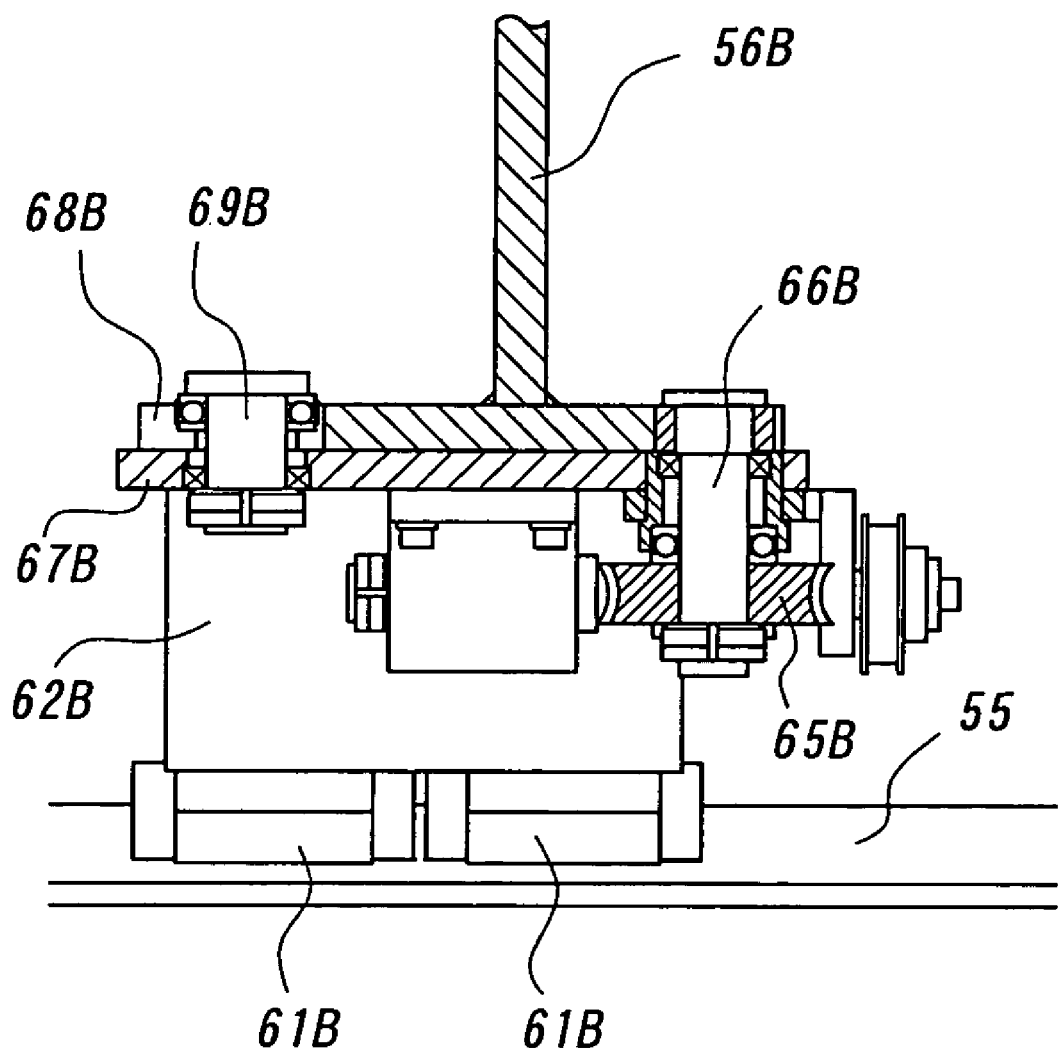
FIG. 14 is a cross sectional view of a bead-core transfer device.

In the meantime, the running base portion 57B of the right bead-core transfer device 54B shown in FIG. 10 is shown in a plan view in FIG. 13. Also, FIG. 14 is a XIV-XIV cross sectional view of FIG. 13. This running base portion 57B is provided with a runner 61B running on two rails 55 and each of base blocks 62B fixed to the runner 61A. On both of the base blocks 62B, a fixed plate 67B extended between them is provided.

To the fixed plate 67B, a rotation center shaft 69B facing vertically is mounted, and a base 68B of the holding part 56B is locked by this rotation center shaft 69B capable of oscillation. That is, the holding part 56A can oscillate in the horizontal surface around the rotation center shaft 69B provided on the running base portion 57B.

On the fixed plate 67B, a servo motor 63B, a warm 64B mounted to an output shaft of the servo motor 63B and a warm wheel 65B engaged with the warm 64B and directly connected to a driving shaft 66B for rotating it are provided. The driving shaft 66B extending in parallel to a rotation center shaft 69B is fixed and connected to the holding part 56A and supported by the fixed plate 67B.

By rotating the servo motor 63B by a predetermined angle and rotating the driving shaft 66B through the warm 64B and the warm wheel 65B, the holding part 56B can be oscillated around the rotation center shaft 69B, and then, the axis line of the holding part 56B can be inclined in the horizontal surface by a required angle.

This tire molding machine of the second embodiment control the "cord path waveform" by inclining the axis L1 of the holding part 56A of the left bead-core transfer device 54A in the vertical surface by a required amount and by inclining the axis L2 of the holding part 56A of the right bead-core transfer device 54A in the horizontal surface, but instead of this, the "cord path waveform" can be controlled with the constitution that the axis of the holding part of one of the right and left bead-core transfer devices is not inclined but fixed, while only the axis of the holding part of the other bead-core transfer device can be inclined either in the horizontal surface and the vertical surface. Moreover, if there is no restriction on space or costs, it is favorable that the axis of the holding part of each of the right and the left bead-core transfer devices is provided capable of inclination either in the horizontal surface and the vertical surface, and by this, an error caused by secular change including manufacture error, installation error and deformation at size switching of the molding machine can be corrected with the axis of the molding drum as standard, and the tire quality can be made the best.

Also, in the above explanation, the servo motor is used for inclining the axis, but instead of this, a normal motor capable of positioning can also achieve the desired object as in the explanation made on the first embodiment.

Figure 15:
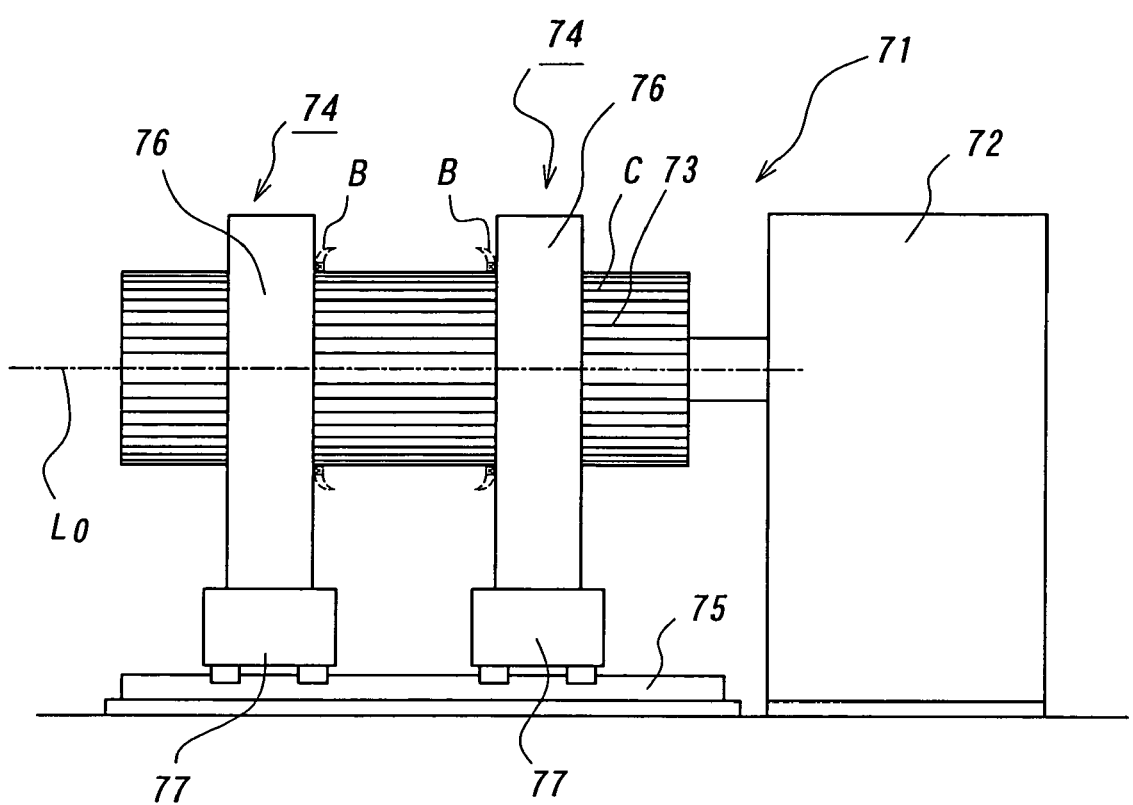
FIG. 15 is a schematic front view showing a third embodiment of a tire molding machine according to the present invention.

A third embodiment of the tire molding machine according to the present invention will be explained based on FIGS. 15 through 19. FIG. 15 is a schematic front view showing the tire molding machine 51. The tire molding machine 71 is provided with a molding machine body 72, a molding drum 73 supported by the molding machine body 72 in the cantilever manner and rotated for setting a tire member including a carcass member, each of bead-core transfer devices 74 disposed on both sides in the axial direction of the molding drum 73 and moved in the axial direction, and a rail 75 supporting them and guiding them in the axial direction.

Each of the bead-core transfer devices 74 has a holding part 76 holding the bead core B and a running base portion 77 supporting the holding part 76 and running on the rail 75, and in the molding machine of this third embodiment, as in the molding machine of the second embodiment, after setting the carcass member C on the molding drum 73, by moving the bead-core transfer device 74 holding the bead core B in the axial direction and arranging each of the holding parts 76 at a predetermined position in the axial direction on the outer periphery of the molding drum 73 and then, by enlarging the diameter of the molding drum 73 and pressing the carcass member C on the inner circumferential face of the held bead core B, the bead core B can be set on the carcass member C.

FIG. 16 is a schematic view showing one of the bead transfer devices 74 of this molding machine 71, FIG. 16(a) is a front view, and FIG. 16(b) is a side view of it. The holding part 76 of this bead transfer device 74 is comprised of 6 bead core segments 78 for holding the bead core B and extending/contracting in the radial direction and a segment holder 79 holding them and guiding the extending/contracting in their radial direction.

Figure 17:
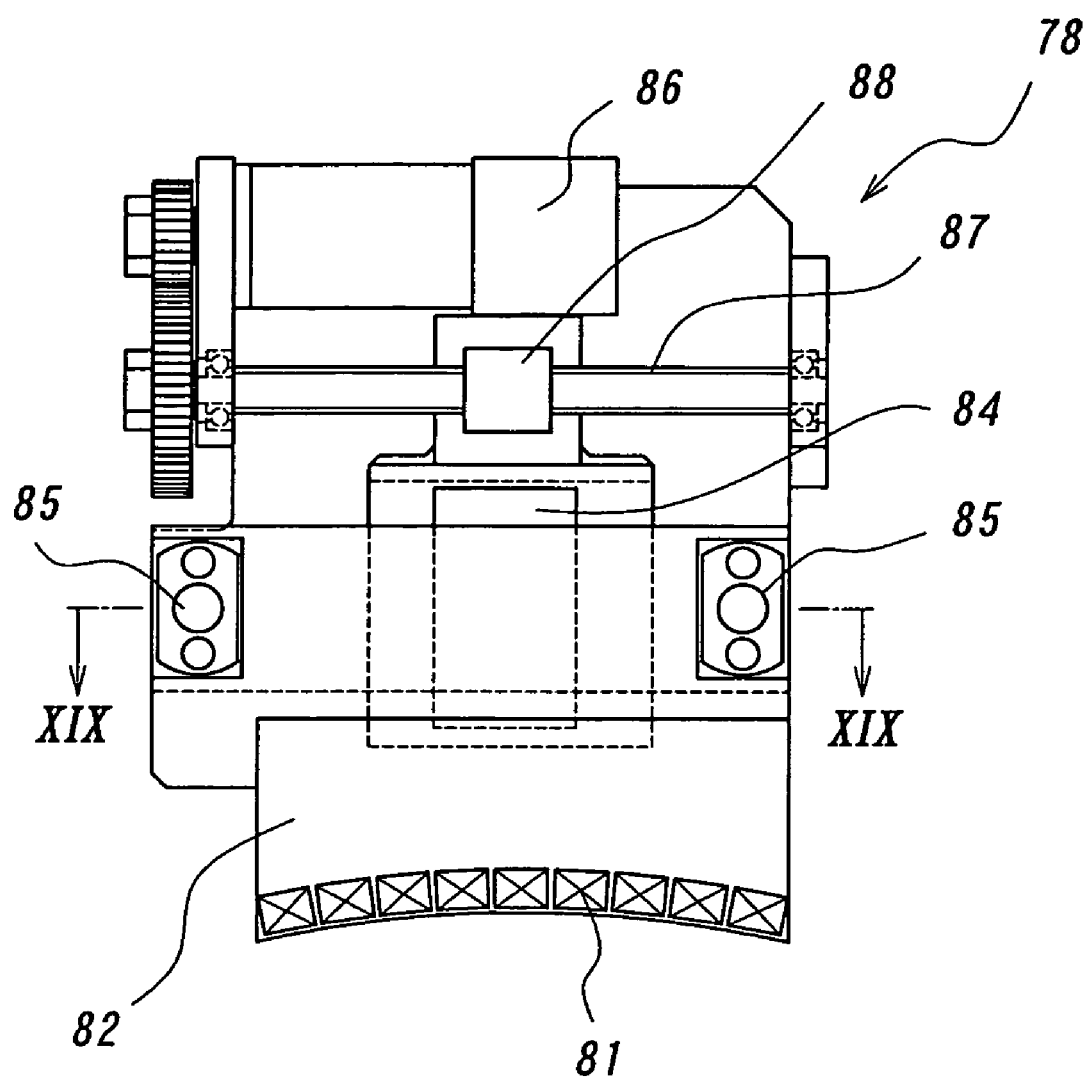
FIG. 17 is a front view of a bead-core segment.
Figure 18:
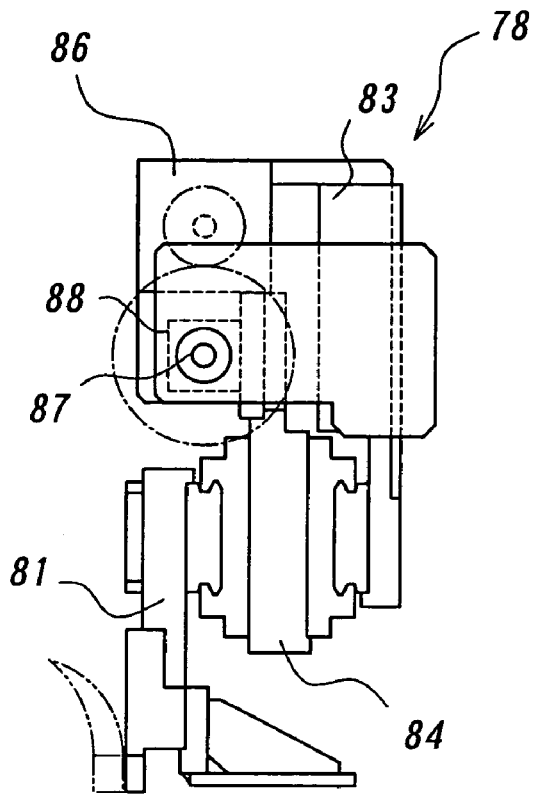
FIG. 18 is a side view of a bead-core segment.
Figure 19:
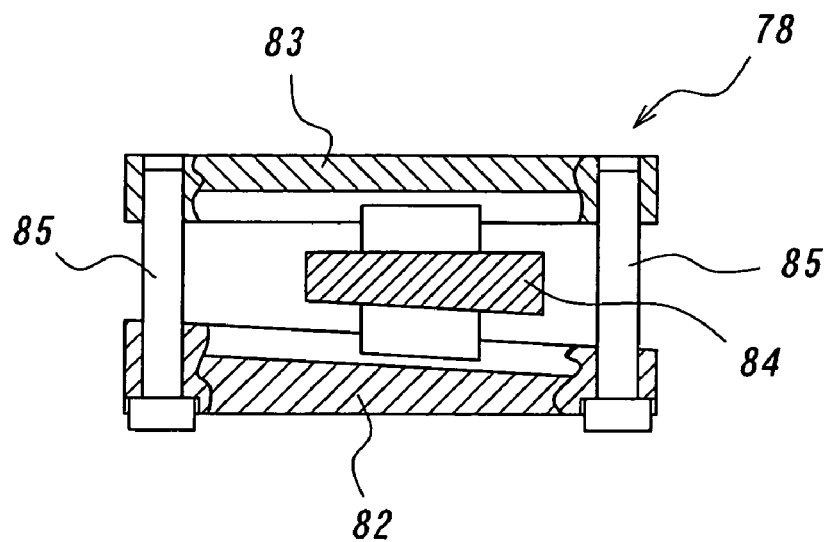
FIG. 19 is a cross sectional view of a bead-core segment.

Detail of the bead core segment 78 will be explained based on FIGS. 17 through 19. FIG. 17 is a front view of each of the bead core segments 78, FIG. 18 is a side view and FIG. 19 is an XIX-XIX cross sectional view of FIG. 17.

The bead core segment 78 is provided with a bead core chuck 82 for attracting the bead core B with a magnet 81 for holding, a segment base 83 engaged with the segment holder 79 and moved in the radial direction and a trapezoidal block 84 engaged with the bead core chuck 82 and the segment base 83, respectively and moved in the direction crossing the axis of the holding part 76.

The bead core chuck 82 is guided by two guide pins 85 provided on the segment base 83 and can be moved only in the direction in parallel to the axis of the holding part 76.

The trapezoidal block 84 is mounted to a screw block 88 connected to the output shaft of a motor 86, engaged with a screw shaft 87 rotated by the motor 86 and moved along the screw shaft 87. Since an engagement surface between the trapezoidal block 84 and the bead core chuck 82 is provided with inclination toward the engagement surface with this segment base 83, the bead core chuck 82 can be moved in parallel to the axis of the holding part 76 with movement of the trapezoidal block 84. And by controlling the rotational angle from start to stop of the motor 86, a movement amount of the bead core chuck 82 in the axial direction of the holding part 76 can be controlled. The smaller the inclination angle of the trapezoidal block 84 to the engagement surface with the segment base 83 and the engagement surface with the bead core chuck 82 is set, the higher the accuracy of the movement amount can be made.

By changing the movement amount of each of the bead core chucks 82 in the axial direction in proportion to the position in the vertical direction of each of these 6 bead core segments 78 operated in this way, the axis of the held bead core B can be inclined in the vertical surface, and by changing the movement amount of each of the bead core chucks 82 in the axial direction in proportion to the position in the right-and-left direction of each of the 6 bead core segments 78, the axis of the held bead core B can be inclined in the horizontal surface. Moreover, if the axis of the bead core B is to be inclined in a required direction other than the horizontal or the vertical direction, this can be achieved by changing the movement amount of the bead core chuck 82 of the bead core segment 78 in the axial direction in proportion to the position along the direction to be inclined.

In this way, in the tire molding machine 71 of this third embodiment, too, the axis of the bead core B can be inclined, and thus, the inclination of the axis of the holding part 76 of the bead-core transfer device 74 can be controlled.

Since the "cord path waveform" can be controlled only by controlling one of the bead core chucks 82 of both the bead-core transfer devices 74, each of the bead core chucks 82 of the other bead-core transfer device may be provided with movement in its axial direction fixed.

In this third embodiment, the inclination of the axis is controlled by controlling the movement amount in the axial direction of each of the bead core chucks 82 of the 6 bead core segments 78, but as its alternative, the "cord path waveform" can be also controlled by using a bead transfer device 74 of a mechanism as shown in FIG. 20. FIG. 20 is a schematic view showing one of the bead transfer devices 74 of the molding machine 71 shown in FIG. 15, FIG. 20(a) is a front view and FIG. 20(b) is a side view of it.

6 bead core segments 78X are mounted to a bed 74Z. And the bead 74Z is supported by a ring 74Y rotatably around a horizontal shaft P2, and the ring 74Y is supported by a frame 74X fixed to a running base portion 77 rotatably around a vertical shaft P1. And by rotating the ring 74Y with respect to the frame 74X around P1 by a predetermined angle and by rotating the bed 74Z with respect to the ring 74Y around P2 by a predetermined angle by using a motor or the like, inclination of the axis of the holding part 76 of the bead-core transfer device 74 can be controlled vertically and horizontally.

Example 1

With a conventional method in which the measurement results of RF of a tire are not fed back to the molding process as a comparative example and a producing method in which the RF measurement results are fed back to the molding process under the following conditions as an example 1, average values of RFV of the tires produced by the respective methods were compared by using the same molding machine and producing the same number of tires of the same sizes in the respective methods.

The producing conditions of the example 1 are as follows:
(1) Tire size: 205/60R15
(2) Number of produced tires: 3900
(3) Feedback method: The vulcanization factor is removed from the respective RF measurement waveforms of the tires produced on the day before the day when they are to be molded, averaged on the molding factor waveform and this average waveform is fed back.
(4) Bead-core axis control mechanism of molding machine: According to the first embodiment.

The RFV level of the average RFV of the tire produced by the method of the example 1 could be improved by 10.4N as compared with the average RFV of the tire produced by the method of the comparative example.

Example 2

With a conventional method in which the measurement results of RR waveform of GT are not fed back to the molding process as a comparative example and a producing method in which the measurement results of RR waveform of GT are fed back to the molding process under the following conditions as an example 2, average values of RFV of the tires produced by the respective methods were compared by using the same molding machine and producing the same number of tires of the same sizes in the respective methods.

The producing conditions of the example 2 are as follows:
(1) Tire size: 205/60R15
(2) Number of produced tires: 3900
(3) Feedback method: Immediately after a green tire is molded by a molding machine, RR waveform of GT is measured on this molding machine, RR waveform is taken by every predetermined number of tires and the average waveform is fed back.
(4) Bead-core axis control mechanism of molding machine: According to the first embodiment.

The RFV level of the average RFV of the tire produced by the method of the example 2 could be improved by 12.5N as compared with the average RFV of the tire produced by the method of the comparative example.

INDUSTRIAL APPLICABILITY

As obvious from the above description, according to the present invention, since an estimation formula is prepared in advance for estimating a primary harmonic component in the waveform of a radial force caused in a produced tire by a mutual positional deviation or an angular deviation between the axis of a carcass member and the axis of the bead core when the bead core is set on the outer periphery of the cylindrical carcass member or a primary harmonic component in the waveform of radial runout in a green tire caused by this deviation;

a single cycle of the radial force of the produced tire or radial runout of the green tire is measured and an inversed waveform with the primary harmonic component inversed is obtained for the measured waveform itself or treatment waveform in which predetermined numerical value treatment is applied to the measurement waveform of the radial force of the produced tire, the mutual positional deviation or the angular deviation between the axis of the carcass member and the axis of the bead core causing this inversed waveform is obtained thereafter by backward calculation of the above estimation formula when a tire of the same size is to be molded with the molding machine which molded this tire, and the bead core is set on the carcass member by changing the position or angle of the axis of at least one of the bead cores in the obtained deviation direction by an obtained deviation size, the level of RFV of the tire to be molded can be improved and hence, variation of RFV between the tires can be reduced.

The invention claimed is:

1. A method for producing a tire provided with a bead core and a carcass extending toroidally between each of bead cores with a side portion folded back outward in the radial direction around the bead core, wherein:

an estimation formula is prepared in advance for estimating a primary harmonic component in the waveform of a radial force caused in a produced tire by a mutual positional deviation or an angular deviation between the axis of a carcass member and the axis of the bead core when the bead core is set on the outer periphery of the carcass member or a primary harmonic component in the waveform of radial runout in a green tire caused by this deviation;

a single cycle of the radial force of the produced tire or radial runout of the green tire is measured and an inversed waveform with the primary harmonic component inversed is obtained for the measured waveform itself or treatment waveform in which predetermined numerical value treatment is applied to the measurement waveform of the radial force of the produced tire;

the mutual positional deviation or the angular deviation between the axis of the carcass member and the axis of the bead core causing this inversed waveform is obtained thereafter by backward calculation of the estimation formula when a tire of the same size is to be molded with a molding machine which molded this tire; and the bead core is set on the carcass member by changing the position or angle of the axis of at least one of the bead cores in the obtained deviation direction by an obtained deviation size.

2. A method for producing a tire according to claim 1, wherein the numerical value treatment is to subtract a variation waveform after molding estimated and prepared in advance and indicating variation of the radial force caused by a process after completion of molding from the measurement waveform of the radial force.

3. A method for producing a tire according to claim 1, wherein in a molding method in which only the diameter of a center portion in the axial direction of the cylindrical carcass member is enlarged, and a bead core is pressed onto a stepped surface generated between it and the remaining carcass member perpendicular to the axial direction from outside the axial direction, and the bead core is set on the carcass member, the position of the axis of at least one of the bead cores is changed, and the bead core is set on the carcass member.

4. A method for producing a tire according to claim 1, wherein in the molding method in which both bead cores are positioned at a predetermined standby position outward in the radial direction of the cylindrical carcass member, the diameter of at least a portion of the carcass member is enlarged on the inner circumferential surface of the bead core, and the bead core is set on the carcass member, the angle of the axis of at least one of the bead cores is changed, and the bead core is set on the carcass member.

5. A method for producing a tire according to claim 2, wherein in a molding method in which only the diameter of a center portion in the axial direction of the cylindrical carcass member is enlarged, and a bead core is pressed onto a stepped surface generated between it and the remaining carcass member perpendicular to the axial direction from outside the axial direction, and the bead core is set on the carcass member, the position of the axis of at least one of the bead cores is changed, and the bead core is set on the carcass member.

6. A method for producing a tire according to claim 2, wherein in the molding method in which both bead cores are positioned at a predetermined standby position outward in the radial direction of the cylindrical carcass member, the diameter of at least a portion of the carcass member is enlarged on the inner circumferential surface of the bead core, and the bead core is set on the carcass member, the angle of the axis of at least of one the bead cores is changed, and the bead core is set on the carcass member.

7. A tire molding machine provided with:

a molding drum for setting a carcass member on the outer circumferential surface of the molding drum and for enlarging the diameter of only the center portion in the axial direction of the set carcass member; and bead setters, each having a holding part for holding one of a pair of bead cores, for moving each of the holding parts in the axial direction and pressing the held bead core to a stepped surface generated on the side of the center portion of the carcass member whose diameter was enlarged from outside in the axial direction, wherein the carcass member comprises carcass cords each having a cord path length as measured between the pair of bead cores, a decentering control mechanism configured to control the cord path length of the carcass cords by decentering the axis of the holding part of at least one of the bead setters to the axis of the molding drum in a required direction only by a required interval, so as to improve uniformity of a produced tire, the axis of the holding part and the axis of the molding drum remain parallel during decentering, and the decentering control mechanism comprises two plates that are perpendicular to the axis of the holding part, a first plate movable in a horizontal direction perpendicular to the axis of the holding part and a second plate movable in a vertical direction relative to the first plate.

8. The tire molding machine according to claim 7, wherein the decentering control mechanism further comprises:

a first means for decentering the axis of the holding part in the horizontal direction; and a second means for decentering the axis of the holding part in the vertical direction.

9. The tire molding machine according to claim 8, wherein the first plate being movable in the horizontal direction by the first means for decentering the axis of the holding part.

10. The tire molding machine according to claim 9, wherein the first plate is attached to the second plate, the second plate being moveable in the vertical direction relative to the first plate by the second means for decentering the axis of the holding part, and the holding part being attached to the second plate.

11. The tire molding machine according to claim 10, wherein the first means for decentering the axis of the holding part is attached to a third, stationary plate.

12. The tire molding machine according to claim 11, wherein the second means for decentering the axis of the tire holding part is attached to the first plate.

* * * * *